United States Patent
Fan et al.

(10) Patent No.: US 7,724,624 B2
(45) Date of Patent: May 25, 2010

(54) METHOD AND SYSTEM FOR SIGNAL GAIN CONTROL IN OPTICAL DISC DRIVES

(75) Inventors: Chih-Yu Fan, Hsinchu County (TW); Ying-Feng Huang, Chia-Yi Hsien (TW); Hung-Hsiang Chang, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 472 days.

(21) Appl. No.: 11/844,359

(22) Filed: Aug. 24, 2007

(65) Prior Publication Data

US 2009/0052292 A1    Feb. 26, 2009

(51) Int. Cl.
G11B 27/00    (2006.01)

(52) U.S. Cl. .............................. 369/53.26; 369/124.11

(58) Field of Classification Search .................. None
See application file for complete search history.

(56) References Cited

U.S. PATENT DOCUMENTS

| | | | |
|---|---|---|---|
| 4,967,404 A | 10/1990 | Orlicki | |
| 5,862,111 A | 1/1999 | Arai | |
| 6,873,583 B2 | 3/2005 | Chiou | |
| 6,917,571 B2 | 7/2005 | Kusumoto | |
| 2005/0058053 A1* | 3/2005 | Ueno et al. | ................. 369/116 |

* cited by examiner

Primary Examiner—Wayne R Young
Assistant Examiner—Brian Butcher
(74) Attorney, Agent, or Firm—Winston Hsu

(57) ABSTRACT

A signal gain control method and system for use in optical disc drives to prevent undesirable saturation occurrences in circuit operations. The method includes fetching a preset reading front monitor diode signal and a preset gain controlling signal for reading; generating a front monitor diode signal by a front monitor diode signal conversion circuit; calculating a gain controlling signal based on the preset gain controlling signal for reading, the preset reading front monitor diode signal, and the front monitor diode signal by a signal processor; adjusting a gain for detection signals according to the gain controlling signal by a gain adjustment unit; and generating control signals according to the adjusted detection signals by a pre-amp module.

25 Claims, 8 Drawing Sheets

METHOD AND SYSTEM FOR SIGNAL GAIN CONTROL IN OPTICAL DISC DRIVES

BACKGROUND OF THE INVENTION

1. Field of the Invention

The present invention relates to a method and system for controlling an optical disc drive, and more specifically, to a method and system for controlling signal gain of the optical disc drive.

2. Description of the Prior Art

With the improvement of computer technologies and the increasing popularity of the Internet, the demand for storing a tremendous amount of information has driven storage media to increase rapidly in storage capacity. Furthermore, the optical disc drive for accessing the information on an optical disc has been tremendously improved with all the efforts. Consequently, the optical disc drive is increasingly important in our daily life. For example, users can access an abundance of information by connecting a computer to the Internet and then storing all the downloaded information onto optical discs. With all of current existing storage medias, the optical disc has featured itself as a low-cost, small-size, low-error-rate, long-storage-time, and high-density storage medium and become the most promising dominant storage medium. Therefore, the corresponding optical storage devices, such as the DVD drives or the DVD burners, are wildly used as standard devices either build-in or accompanied with typical modern computers.

Generally speaking, the optical disc drive accesses data according to optical means, that is, the reading and writing operations include an optical pickup, spindle motor, sled motor, and decoder, encoder IC, etc. The optical pickup, commonly includes a laser diode for reading data or a set of laser diodes for reading and writing data. With respect to the reading process, the optical disc drive sets the output power (also known as the read power) of a laser diode to a desired value. Next, the optical disc drive detects reflected laser light from an optical disc to read data stored on the optical disc. It is well known that the optical disc stores the data utilizing Eight-to Fourteen Modulation signal (EFM signal). This allows the optical disc drive to access data stored on the optical disc by distinguishing a plurality of different intensities of reflected laser light that are generated from the EFM signal. With respect to the writing process, the optical disc drive properly sets the output power (also known as the write power) of the laser diode according to the data waiting to be written onto the optical disc. Accordingly, for reading data from the optical disc or recording data onto the optical disc, the output powers of the laser diode are quite different.

Please refer to FIG. 1. FIG. 1 shows a schematic diagram of an optical disc drive 100 (only components relating to servo control processes are shown) according to the related art. The optical disc drive 100 comprises an optical pickup 110, an auto-power-control (APC) circuit 115, a pre-amp module 120, an analog-to-digital converter (ADC) 130, a compensator module 140, a digital-to-analog converter (DAC) 150, a driver module 160, and an actuator module 170.

The optical pickup 110 outputs a laser light onto an optical disc 101. A plurality of photodiodes of the optical pickup 110 generates a plurality of receiving signals in analog form, such as signals A, B, C, D, E, F, and a front monitor diode signal FMD, according to receiving light beams respectively. The signals A, B, C, D, E, and F are generated according to light beams reflected off the optical disc 101. A front monitor diode (not shown) of the optical pickup 110 senses a portion of laser power for generating the front monitor diode signal FMD so as to adjust the current driving the laser diode such that a desired read or write power is achieved despite temperature change or aging of the laser diode. The APC circuit 115 is utilized to compensate the deviations in the actual laser power level from desirable levels according to the front monitor diode signal FMD.

The pre-amp module 120 comprises amplification circuits for processing the receiving signals A-F so as to generate control signals in analog form, such as the FE (focusing error) signal, the TE (tracking error) signal, and the wobble signal, etc.

The compensator module 140 could be interpreted as a digital signal processor (DSP) in this exemplary embodiment. After the ADC 130 converts the analog servo control signals into digital servo control signals, the compensator module 140 generates a digital compensating signal according to the digital servo control signals. Subsequently, the DAC 150 converts the digital compensating signal into an analog compensating signal. Then, the driver module 160 generates a driving signal according to the analog compensating signal. Thereafter, the actuator module 170 processes the servo control task adequately according to the driving signal.

Please refer to FIG. 2. FIG. 2 is a schematic diagram illustrating different detection signals generated by the optical pickup 110 for a read-detecting signal 210, a first write-detecting signal 220, and a second write-detecting signal 230, having time along the abscissa. The detection signal in a reading process from an optical disc is shown as a read-detecting signal 210. The detection signal in a first writing process for a rewritable optical disc is shown as a 1st write-detecting signal 220. The detection signal in a second writing process for a rewritable optical disc is shown as a 2nd write-detecting signal 230.

The amplitude of the read-detecting signal 210 is much smaller than the amplitude of the first write-detecting signal 220, which results from a higher laser power while performing a writing process. The amplitude of the second write-detecting signal 230 is greater than the amplitude of the first write-detecting signal 220, which means that a higher writing laser power is required after a first writing process on a rewritable optical disc. Therefore, while processing an amplification process on detection signals having different amplitudes from the optical pickup 110 by the pre-amp module 120, signals having higher amplitudes such as the 2nd write-detecting signal 230 may cause undesirable saturation occurrences in circuit operations.

SUMMARY OF THE INVENTION

It is one of the objects of the present invention to provide a method and system for controlling the signal gain while performing a reading process, writing process, or in-transition from power change.

The exemplary embodiment of the present invention for controlling signal gain while performing a reading process in an optical disc drive that comprises fetching a preset reading front monitor diode signal; fetching a preset gain controlling signal for reading; performing reading data on an optical disc; generating a reading front monitor diode signal; calculating a gain controlling signal for reading based on the preset gain controlling signal for reading, the preset reading front monitor diode signal, and the reading front monitor diode signal; adjusting a gain for signal detection according to the gain controlling signal; and generating control signals during a reading process according to signals with the adjusted gain.

The exemplary embodiment of the present invention for controlling signal gain while performing a writing process in an optical disc drive comprises fetching a preset reading front monitor diode signal; fetching a preset gain controlling signal for reading; performing writing data on an optical disc; generating a writing front monitor diode signal; calculating a gain controlling signal for writing based on the preset gain controlling signal for reading, the preset reading front monitor diode signal, and the writing front monitor diode signal; adjusting a gain for signal detection according to the gain controlling signal; and generating control signals during the writing process according to the signals with the adjusted gain.

The exemplary embodiment of the present invention further provides a signal gain control system in an optical disc drive that comprises a front monitor diode signal conversion circuit for generating a front monitor diode signal; a signal processor for generating a gain controlling signal based on the front monitor diode signal, a preset gain controlling signal for reading, and a preset reading front monitor diode signal; and a gain adjustment unit for adjusting a gain according to the gain controlling signal. The gain controlling signal is generated through dividing the product of the preset gain controlling signal for reading and the preset reading front monitor diode signal by the front monitor diode signal.

These and other embodiments of the present invention will no doubt become obvious to those of ordinary skill in the art after reading the following detailed description of the embodiment that is illustrated in the various figures and drawings.

DETAILED DESCRIPTION

Figure 1:
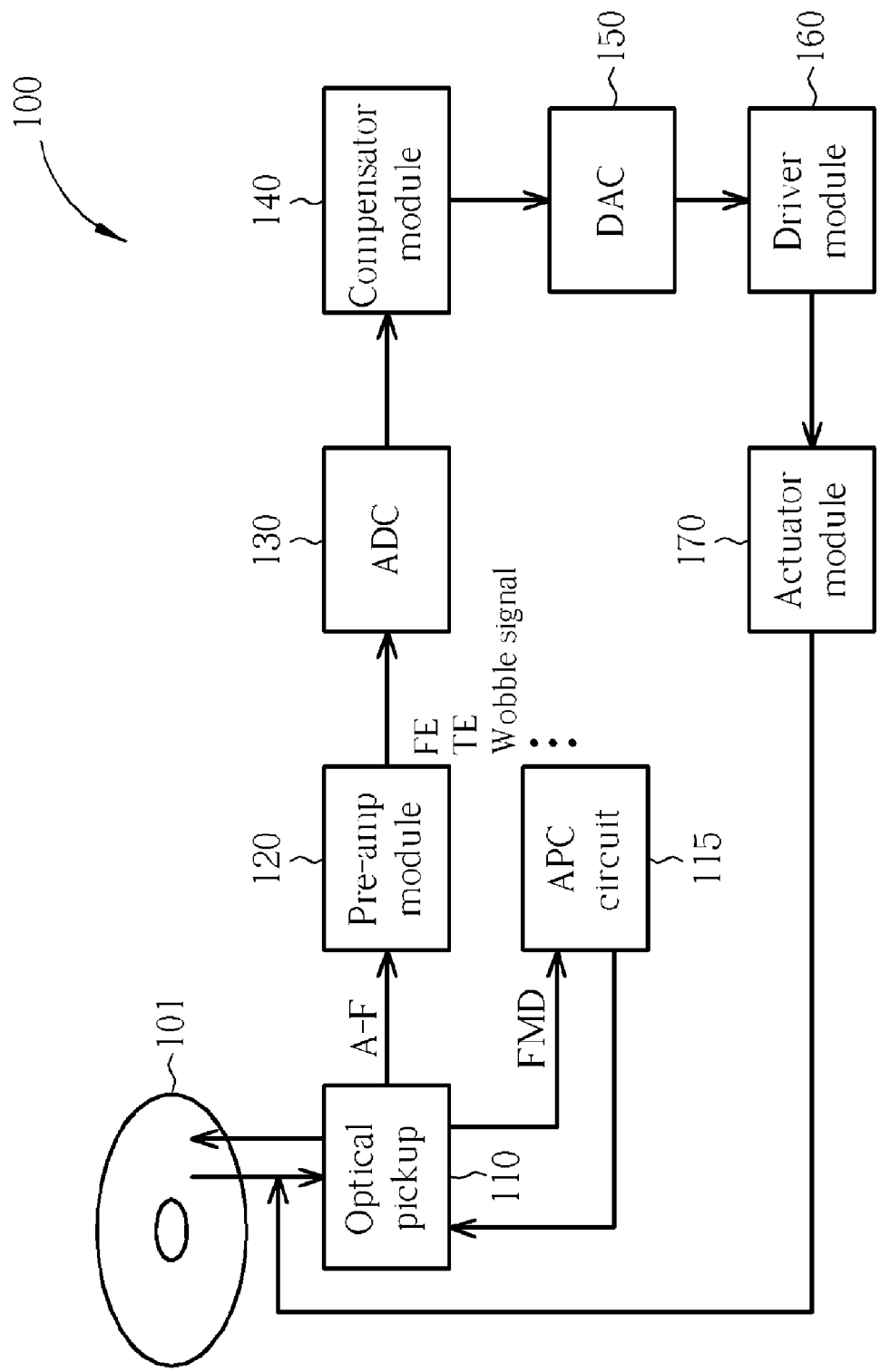
FIG. 1 shows a schematic diagram of an optical disc drive according to the related art.
Figure 2:
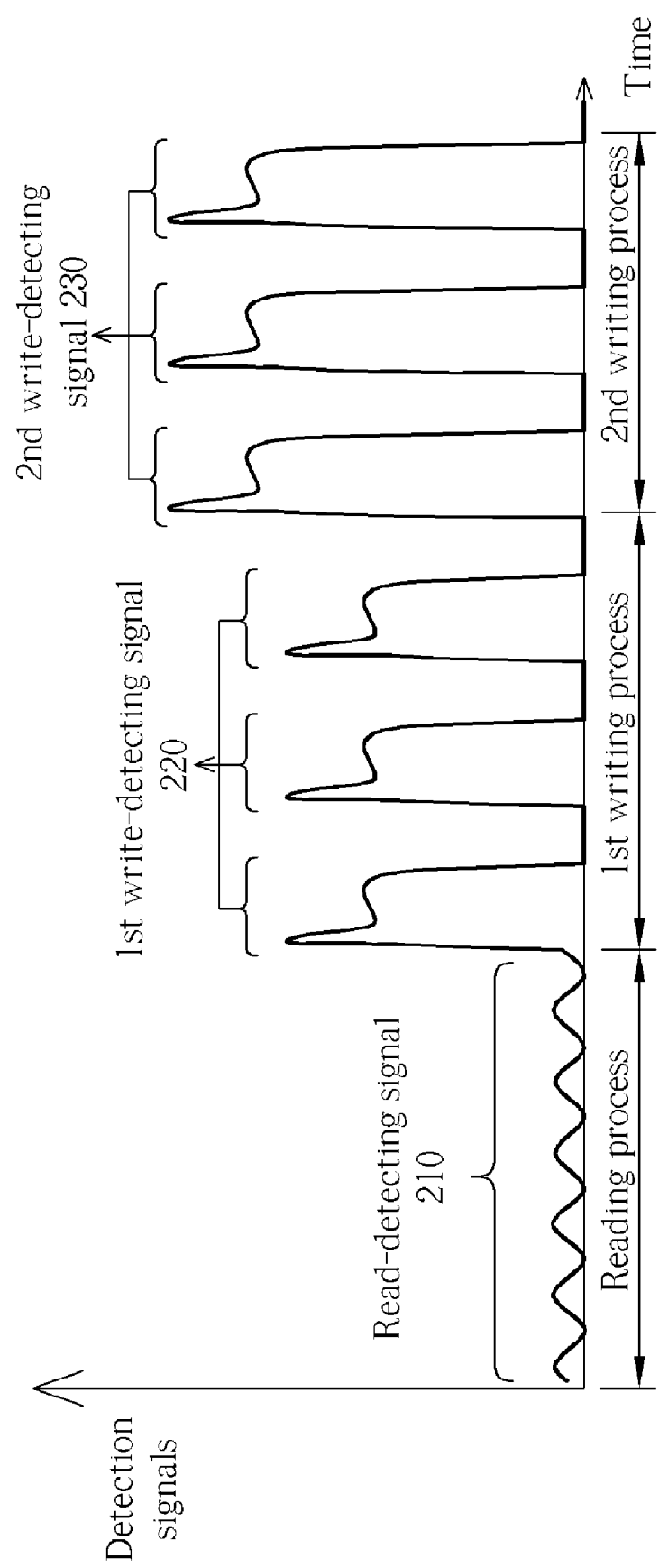
FIG. 2 is a schematic diagram illustrating different detection signals generated by the optical pickup for a read-detecting signal, a first write-detecting signal, and a second write-detecting signal.
Figure 3:
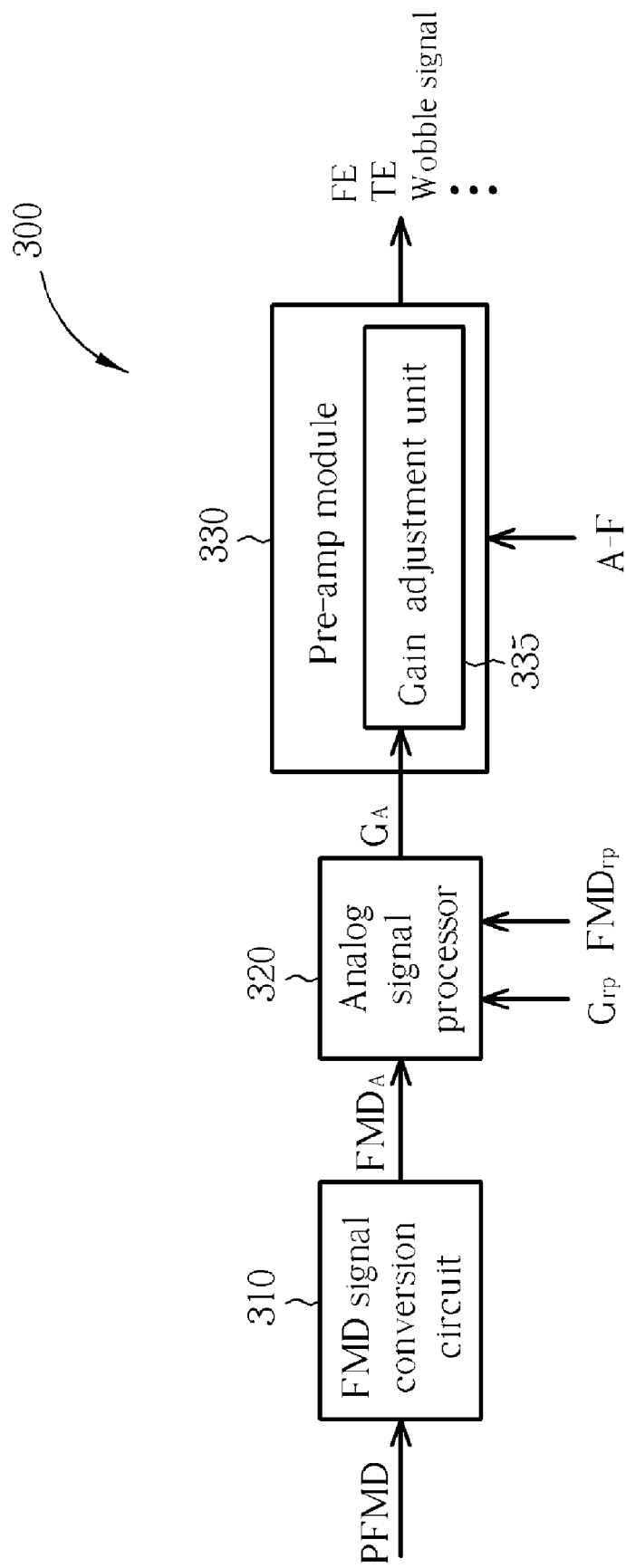
FIG. 3 is a functional block diagram illustrating a signal gain control system according to a first embodiment of the present invention.

Please refer to FIG. 3. FIG. 3 is a functional block diagram illustrating a signal gain control system 300 according to a first embodiment of the present invention. The signal gain control system 300 comprises an FMD signal conversion circuit 310, an analog signal processor 320, and a pre-amp module 330. The FMD signal conversion circuit 310 converts a primary front monitor diode signal PFMD into an analog front monitor diode signal $FMD_A$. An analog gain controlling signal $G_A$ is generated by the analog signal processor 320 through performing a signal processing procedure on the received analog front monitor diode signal $FMD_A$ in conjunction with a preset gain controlling signal $G_{rp}$ for reading and a preset reading front monitor diode signal $FMD_{rp}$ so as to prevent undesirable saturation occurrences in circuit operations of the pre-amp module 330. The analog signal processor 320 performs the signal processing procedure to calculate the analog gain controlling signal $G_A$ through dividing the product of the preset gain controlling signal $G_{rp}$ for reading and the preset reading front monitor diode signal $FMD_{rp}$ by the analog front monitor diode signal $FMD_A$.

The pre-amp module 330 comprises a gain adjustment unit 335 that takes advantage of the analog gain controlling signal $G_A$ to adjust the gain for the signals A-F to generate control signals such as the FE signal, the TE signal, and the wobble signal, etc. Consequently, the pre-amp module 330 is able to prevent undesirable saturation occurrences in circuit operations. In some embodiments, the pre-amp module 330 controls one or more servo gains for generating one or more servo control signal such as FE signal, TE signal, etc., but in some other embodiments, the pre-amp module 330 controls one or more other signal gains such as wobble gain for generating wobble signal, and of cause the pre-amp module 330 is capable of controlling a combination of servo and wobble gains for generating servo control and wobble signals.

Figure 4:
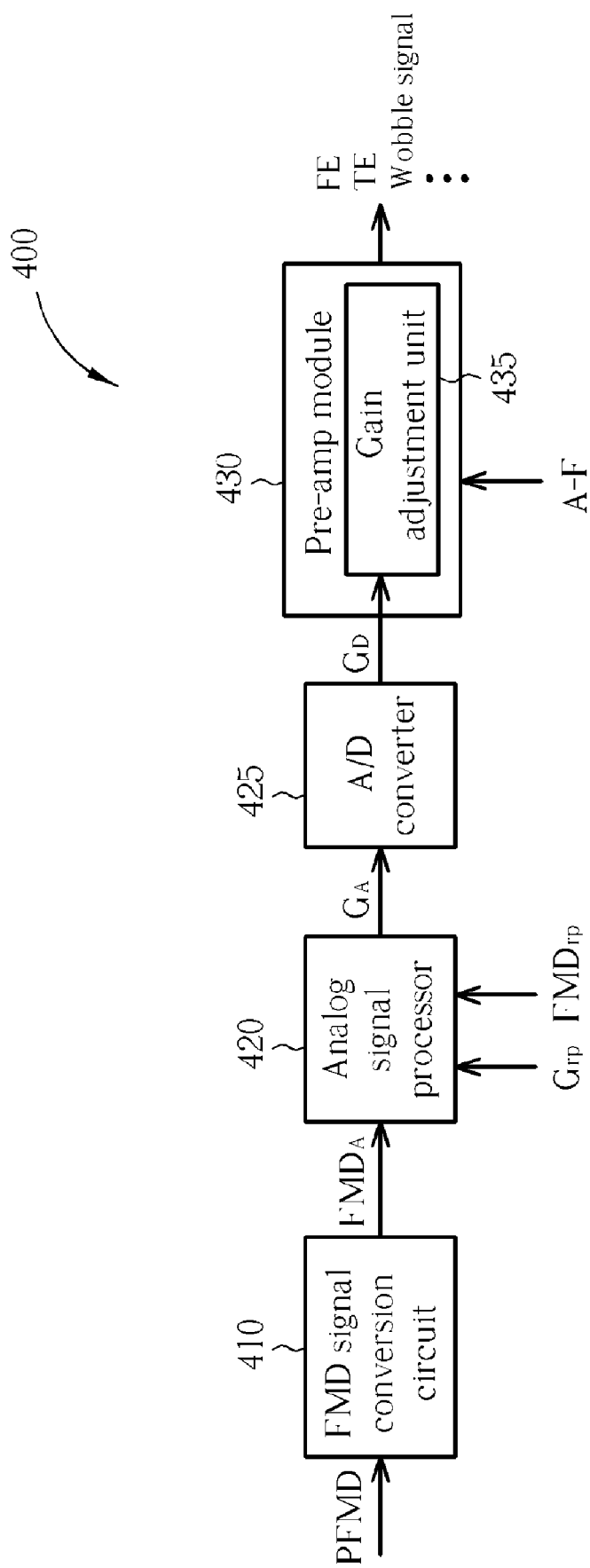
FIG. 4 is a functional block diagram illustrating a signal gain control system according to a second embodiment of the present invention.

Please refer to FIG. 4. FIG. 4 is a functional block diagram illustrating a signal gain control system 400 according to a second embodiment of the present invention. The signal gain control system 400 comprises an FMD signal conversion circuit 410, an analog signal processor 420, an analog-to-digital converter 425, and a pre-amp module 430. The FMD signal conversion circuit 410 converts a primary front monitor diode signal PFMD into an analog front monitor diode signal $FMD_A$. An analog gain controlling signal $G_A$ is generated by the analog signal processor 420 through performing a signal processing procedure on the received analog front monitor diode signal $FMD_A$ in conjunction with a preset gain controlling signal $G_{rp}$ for reading and a preset reading front monitor diode signal $FMD_{rp}$ so as to prevent undesirable saturation occurrences in circuit operations of the pre-amp module 430. The analog signal processor 420 can perform the signal processing procedure to calculate the analog gain controlling signal $G_A$ through dividing the product of the preset gain controlling signal $G_{rp}$ for reading and the preset reading front monitor diode signal $FMD_{rp}$ by the analog front monitor diode signal $FMD_A$.

The analog-to-digital converter 425 converts the analog gain controlling signal $G_A$ into a digital gain controlling signal $G_D$. The pre-amp module 430 comprises a gain adjustment unit 435 that takes advantage of the digital gain controlling signal $G_D$ to adjust the gain for the signals A-F to generate servo control signals such as the FE signal, the TE signal, etc, or/and the wobble signal. Consequently, the pre-amp module 430 is able to prevent undesirable saturation occurrences in circuit operations.

Figure 5:
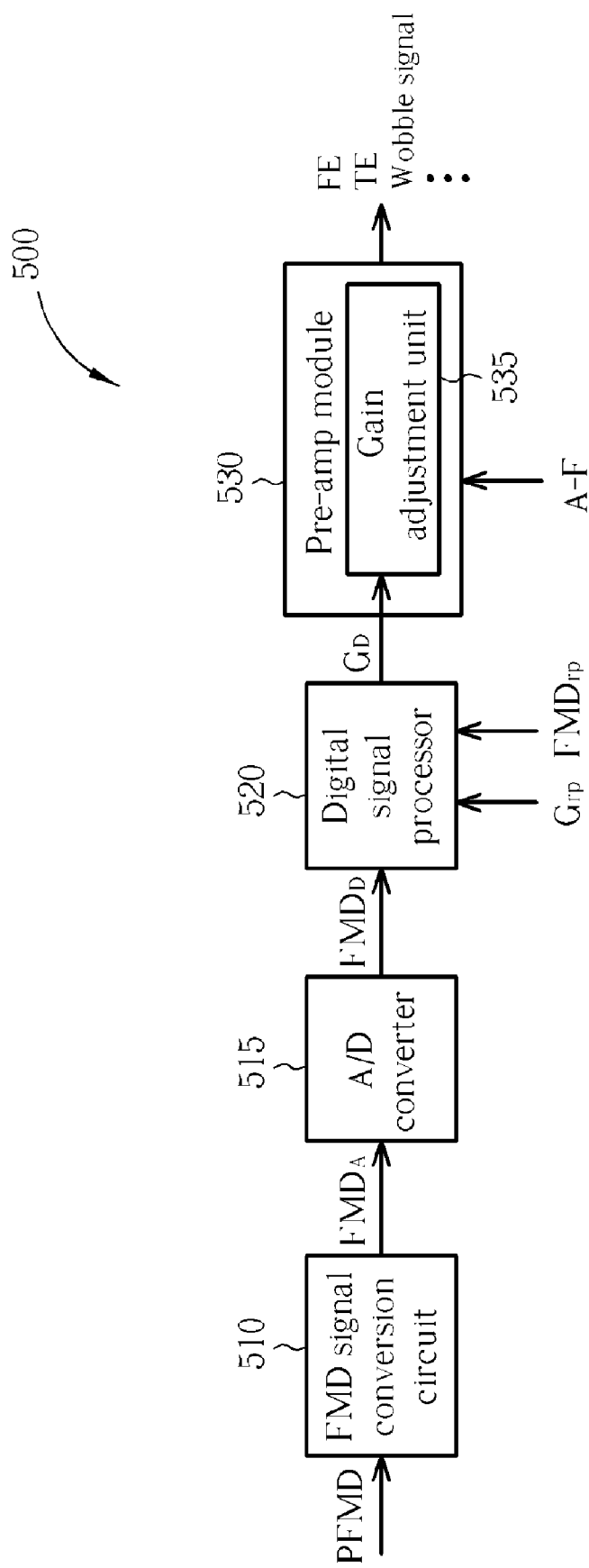
FIG. 5 is a functional block diagram illustrating a signal gain control system according to a third embodiment of the present invention.

Please refer to FIG. 5. FIG. 5 is a functional block diagram illustrating a signal gain control system 500 according to a third embodiment of the present invention. The signal gain control system 500 comprises an FMD signal conversion circuit 510, an analog-to-digital converter 515, a digital signal processor 520, and a pre-amp module 530. The FMD signal conversion circuit 510 converts a primary front monitor diode signal PFMD into an analog front monitor diode signal $FMD_A$. The analog-to-digital converter 515 converts the analog front monitor diode signal $FMD_A$ into a digital signal $FMD_D$. A digital gain controlling signal $G_D$ is generated by the digital signal processor 520 through performing a signal processing procedure on the received digital signal $FMD_D$ in conjunction with a preset gain controlling signal $G_{rp}$ for reading and a preset reading front monitor diode signal $FMD_{rp}$ so as to prevent undesirable saturation occurrences in circuit operations of the pre-amp module 530. The digital signal processor 520 performs the signal processing procedure to calculate the digital gain controlling signal $G_D$ through dividing the product of the preset gain controlling signal $G_{rp}$ for reading and the preset reading front monitor diode signal $FMD_{rp}$ by the digital signal $FMD_D$.

The pre-amp module 530 comprises a gain adjustment unit 535 that takes advantage of the digital gain controlling signal $G_D$ to adjust the gain for the signals A-F to generate control signals. Consequently, the pre-amp module 530 is able to prevent undesirable saturation occurrences in circuit operations.

Figure 6:
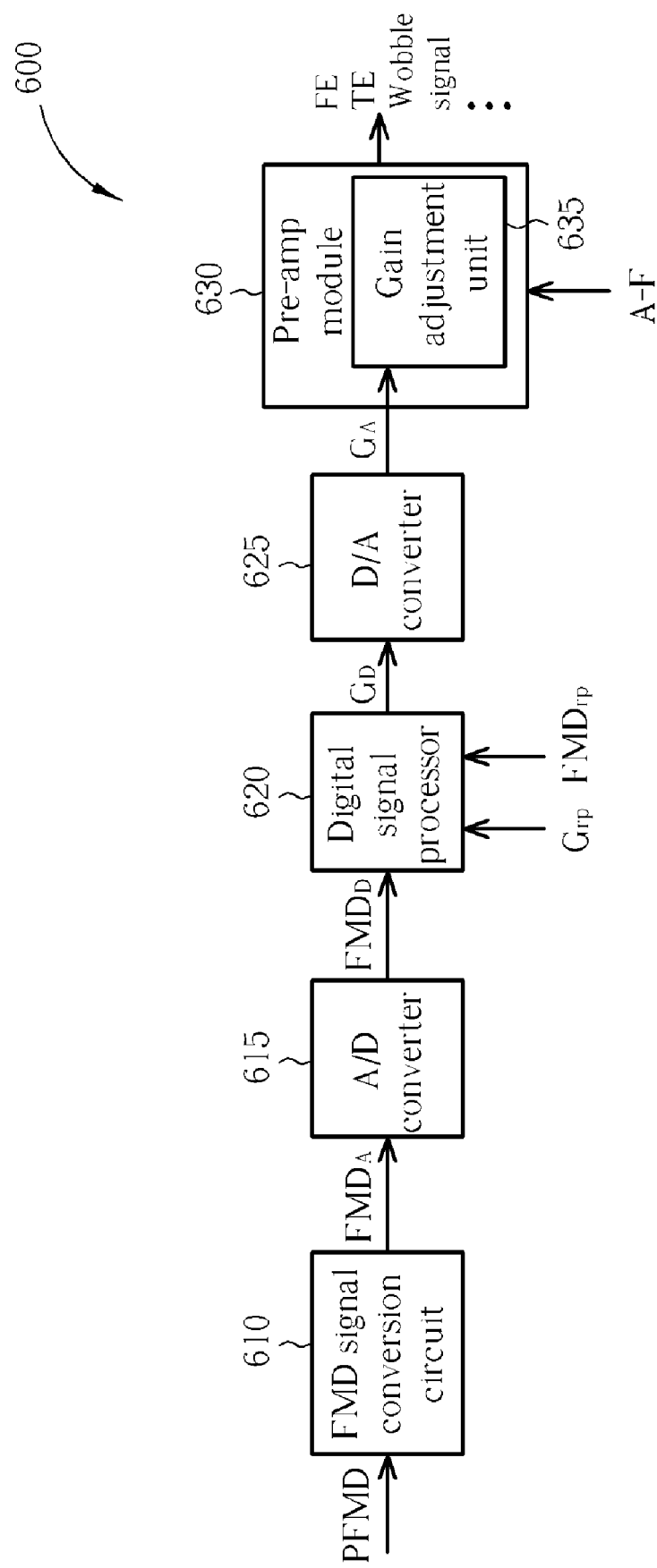
FIG. 6 is a functional block diagram illustrating a signal gain control system according to a fourth embodiment of the present invention.

Please refer to FIG. 6. FIG. 6 is a functional block diagram illustrating a signal gain control system 600 according to a fourth embodiment of the present invention. The signal gain control system 600 comprises a FMD signal conversion circuit 610, an analog-to-digital converter 615, a digital signal processor 620, a digital-to-analog converter 625, and a pre-amp module 630. The FMD signal conversion circuit 610 converts a primary front monitor diode signal PFMD into an analog front monitor diode signal $FMD_A$. The analog-to-digital converter 615 converts the analog front monitor diode signal $FMD_A$ into a digital signal $FMD_D$. A digital gain controlling signal $G_D$ is generated by the digital signal processor 620 through performing a signal processing procedure on the received digital signal $FMD_D$ in conjunction with a preset gain controlling signal $G_{rp}$ for reading and a preset reading front monitor diode signal $FMD_{rp}$ so as to prevent undesirable saturation occurrences in circuit operations of the pre-amp module 630. The digital signal processor 620 can perform the signal processing procedure to calculate the digital gain controlling signal $G_D$ through dividing the product of the preset gain controlling signal $G_{rp}$ for reading and the preset reading front monitor diode signal $FMD_{rp}$ by the digital signal $FMD_D$.

The digital-to-analog converter 625 converts the digital gain controlling signal $G_D$ into an analog gain controlling signal $G_A$. The pre-amp module 630 comprises a gain adjustment unit 635 that takes advantage of the analog gain controlling signal $G_A$ to adjust the gain for the signals A-F to generate control signals. Consequently, the pre-amp module 630 is able to prevent undesirable saturation occurrences in circuit operations.

Figure 7:
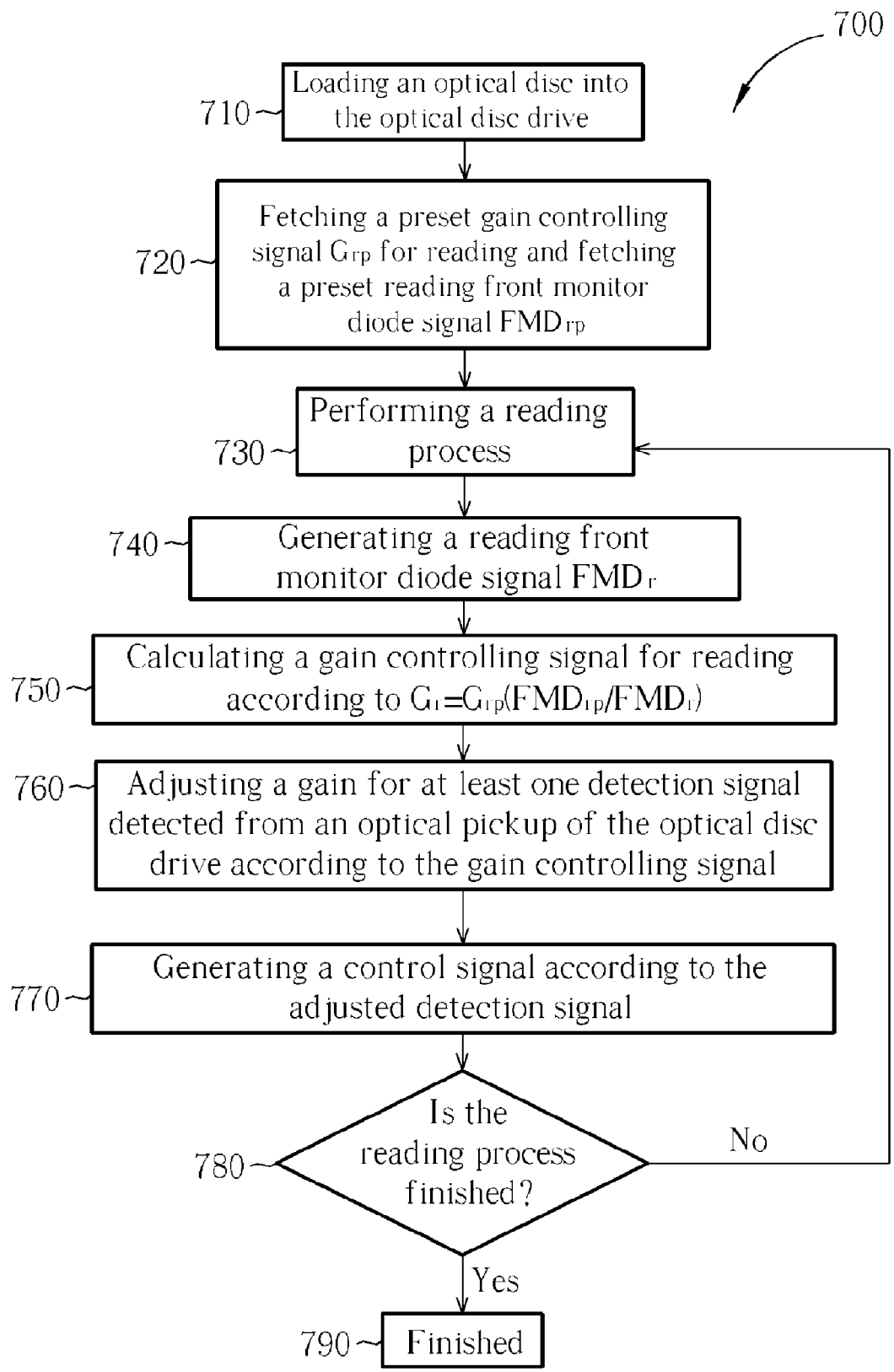
FIG. 7 is a flowchart illustrating a signal gain control method while performing a reading process in an optical disc drive according to an embodiment of the present invention.

Please refer to FIG. 7. FIG. 7 is a flowchart illustrating a signal gain control method 700 while performing a reading process in an optical disc drive according to an embodiment of the present invention. The preferred signal gain control method comprises the following steps:

Step 710: Loading an optical disc into the optical disc drive;
Step 720: Fetching a preset gain controlling signal $G_{rp}$ for reading and fetching a preset reading front monitor diode signal $FMD_{rp}$;
Step 730: Performing a reading process;
Step 740: Generating a reading front monitor diode signal $FMD_r$;
Step 750: Calculating a gain controlling signal for reading according to $G_r=G_{rp}(FMD_{rp}/FMD_r)$;
Step 760: Adjusting a gain for at least one detection signal detected from an optical pickup of the optical disc drive according to the gain controlling signal;
Step 770: Generating a control signal according to the adjusted detection signal;
Step 780: If the reading process is finished, go to step 790; if the reading process is not finished, jump to step 730; and
Step 790: Finished.

In step 720, fetching a preset reading front monitor diode signal $FMD_{rp}$ may comprise: generating the preset reading front monitor diode signal $FMD_{rp}$ in a reading process while loading an optical disc; storing the preset reading front monitor diode signal $FMD_{rp}$; and fetching the preset reading front monitor diode signal $FMD_{rp}$. Alternatively, in step 720, fetching a preset reading front monitor diode signal $FMD_{rp}$ may comprise: storing the preset reading front monitor diode signal $FMD_{rp}$ in a non-volatile memory device; and fetching the preset reading front monitor diode signal $FMD_{rp}$ from the non-volatile memory device.

In step 720, fetching a preset gain controlling signal $G_{rp}$ for reading may comprise: storing the preset gain controlling signal for reading in a non-volatile memory device; and fetching the preset gain controlling signal for reading from the non-volatile memory device. Alternatively, in step 720, fetching a preset gain controlling signal $G_{rp}$ for reading may comprise: storing a preliminary gain controlling signal for reading in a non-volatile memory device; fetching the preliminary gain controlling signal for reading from the non-volatile memory device; generating the reading front monitor diode signal in a reading process while loading an optical disc; calculating the preset gain controlling signal for reading at the reading process through dividing the product of the preliminary gain controlling signal for reading and the preset reading front monitor diode signal by the reading front monitor diode signal; and fetching a preset gain controlling signal for reading.

In step 750, a gain controlling signal $G_r$ for reading is generated through dividing the product of the preset gain controlling signal $G_{rp}$ for reading and the preset reading front monitor diode signal $FMD_{rp}$ by the reading front monitor diode signal $FMD_r$ (step 750) so as to adjust the gain of a pre-amp module of the optical disc drive for the detection signals A-F (step 760) and generate control signals, such as the TE signal, the FE signal, and the wobble signal, etc., during the reading process (step 770). Accordingly, the undesirable saturation occurred in circuit operations of the pre-amp module is prevented and the deterioration rate of the related components installed in the pre-amp module is further reduced.

Figure 8:
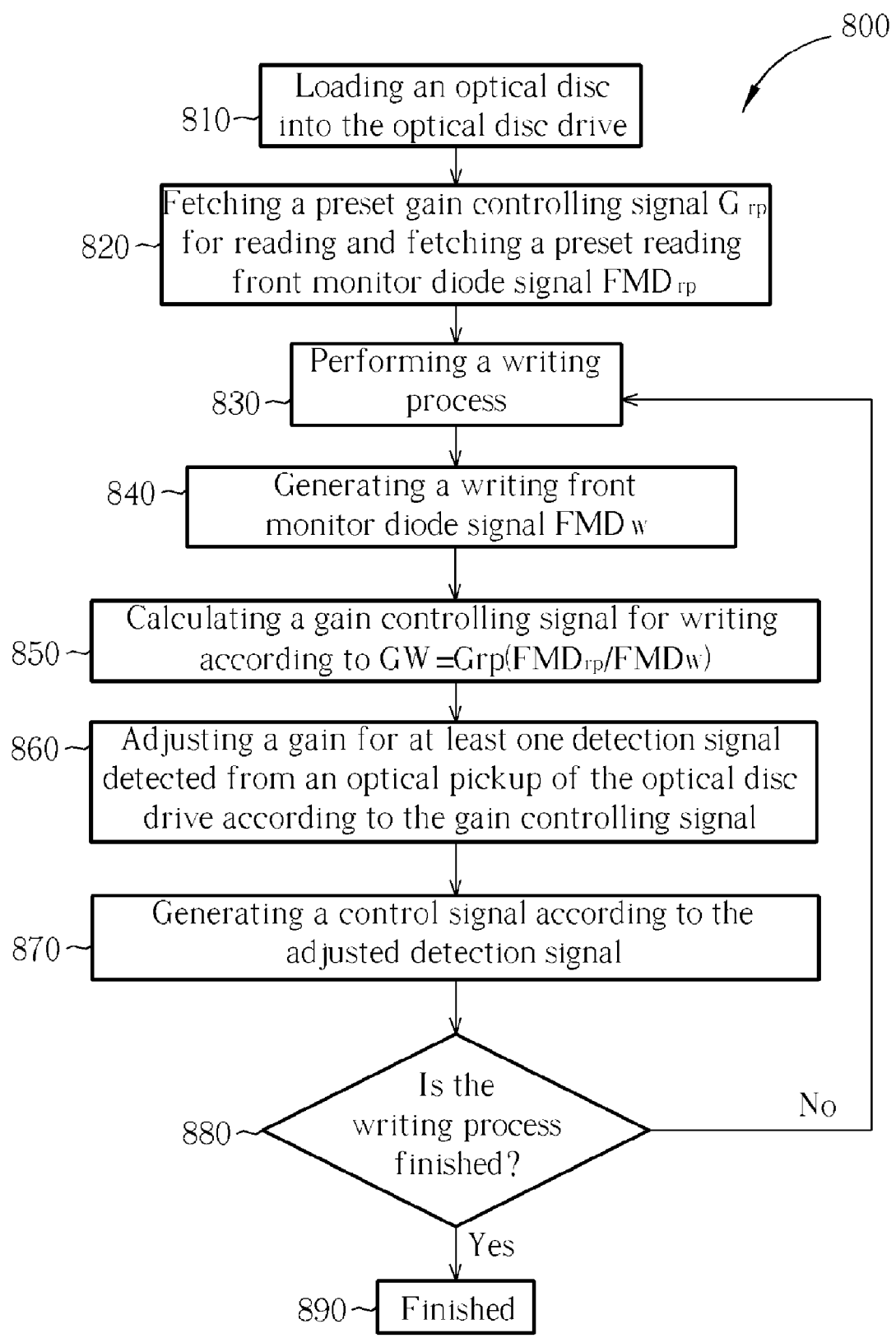
FIG. 8 is a flowchart illustrating a signal gain control method while performing a writing process in an optical disc drive according to an embodiment of the present invention.

Please refer to FIG. 8. FIG. 8 is a flowchart illustrating a signal gain control method 800 while performing a writing process in an optical disc drive according to an embodiment of the present invention. The preferred signal gain control method comprises the following steps:

Step 810: Loading an optical disc into the optical disc drive;
Step 820: Fetching a preset gain controlling signal $G_{rp}$ for reading and fetching a preset reading front monitor diode signal $FMD_{rp}$;
Step 830: Performing a writing process;
Step 840: Generating a writing front monitor diode signal $FMD_W$;
Step 850: Calculating a gain controlling signal for writing according to $G_W=G_{rp}(FMD_{rp}/FMD_W)$;
Step 860: Adjusting a gain for at least one detection signal detected from an optical pickup of the optical disc drive according to the gain controlling signal;
Step 870: Generating a control signal according to the adjusted detection signal;
Step 880: If the writing process is finished, go to step 890; if the writing process is not finished, jump to step 830; and
Step 890: Finished.

In step 820, fetching a preset reading front monitor diode signal $FMD_{rp}$ may comprise: generating the preset reading front monitor diode signal $FMD_{rp}$ in a reading process while loading an optical disc; storing the preset reading front monitor diode signal $FMD_{rp}$; and fetching the preset reading front monitor diode signal $FMD_{rp}$. Alternatively, in step 820, fetching a preset reading front monitor diode signal $FMD_{rp}$ may comprise: storing the preset reading front monitor diode signal $FMD_{rp}$ in a non-volatile memory device; and fetching the preset reading front monitor diode signal $FMD_{rp}$ from the non-volatile memory device.

In step 820, fetching a preset gain controlling signal $G_{rp}$ for reading may comprise: storing the preset gain controlling signal for reading in a non-volatile memory device; and fetching the preset gain controlling signal for reading from the non-volatile memory device. Alternatively, in step 820, fetching a preset gain controlling signal $G_{rp}$ for reading may comprise: storing a preliminary gain controlling signal for reading in a non-volatile memory device; fetching the preliminary gain controlling signal for reading from the non-volatile memory device; generating the reading front monitor diode signal in a reading process while loading an optical disc; calculating the preset gain controlling signal for reading at the reading process through dividing the product of the preliminary gain controlling signal for reading and the preset reading front monitor diode signal by the reading front monitor diode signal; and fetching a preset gain controlling signal for reading.

In step 850, a gain controlling signal $G_W$ for writing is generated through dividing the product of the preset gain controlling signal $G_{rp}$ for reading and the preset reading front monitor diode signal $FMD_{rp}$ by the writing front monitor diode signal $FMD_W$ so as to adjust the gain of a pre-amp module of the optical disc drive for the detection signals A-F (step 860) and generate control signals, such as the TE signal, the FE signal, and the wobble signal, etc., during the writing process (step 870). Accordingly, the undesirable saturation occurred in circuit operations of the pre-amp module is prevented and the deterioration rate of the related components installed in the pre-amp module is further reduced.

In summary, the signal gain control method of the present invention is able to prevent the undesirable saturation occurrences in circuit operations of the pre-amp module regardless of detection signals having different amplitudes from the optical pickup in an optical disc drive.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a signal gain in an optical disc drive during a reading process, wherein the method comprises:
    fetching a preset reading front monitor diode signal;
    fetching a preset gain controlling signal for reading;
    performing a reading operation;
    generating a first reading front monitor diode signal;
    calculating a first gain controlling signal for reading at the reading process based on the preset gain controlling signal for reading, the preset reading front monitor diode signal, and the first reading front monitor diode signal;
    adjusting a first detection signal from an optical pickup of the optical disc drive according to the first gain controlling signal; and
    generating a first control signal according to the adjusted first detection signal.

2. The method of claim 1, wherein calculating the first gain controlling signal for reading at the reading process based on the preset gain controlling signal for reading, the preset reading front monitor diode signal, and the first reading front monitor diode signal comprises:
    calculating the first gain controlling signal for reading through dividing the product of the preset gain controlling signal for reading and the preset reading front monitor diode signal by the first reading front monitor diode signal.

3. The method of claim 1, further comprising:
    generating a second reading front monitor diode signal if the reading process is not finished;
    calculating a second gain controlling signal for reading at the reading process based on the preset gain controlling signal for reading, the preset reading front monitor diode signal, and the second reading front monitor diode signal;
    adjusting a second detection signal from the optical pickup of the optical disc drive according to the second gain controlling signal; and
    generating a second control signal according to the adjusted second detection signal.

4. The method of claim 3, wherein the step of calculating the second gain controlling signal for reading at the reading process based on the preset gain controlling signal for reading, the preset reading front monitor diode signal, and the second reading front monitor diode signal comprises:
    calculating the second gain controlling signal for reading through dividing the product of the preset gain controlling signal for reading and the preset reading front monitor diode signal by the second reading front monitor diode signal.

5. The method of claim 1, wherein fetching the preset reading front monitor diode signal comprises:
    generating the preset reading front monitor diode signal in a reading operation while loading an optical disc;
    storing the preset reading front monitor diode signal; and
    fetching the preset reading front monitor diode signal.

6. The method of claim 1, wherein fetching the preset reading front monitor diode signal comprises:
    storing the preset reading front monitor diode signal in a non-volatile memory device; and
    fetching the preset reading front monitor diode signal from the non-volatile memory device.

7. The method of claim 1, wherein fetching the preset gain controlling signal for reading comprises:
    storing the preset gain controlling signal for reading in a non-volatile memory device; and
    fetching the preset gain controlling signal for reading from the non-volatile memory device.

8. The method of claim 1, wherein fetching the preset gain controlling signal for reading comprises:
    storing a preliminary gain controlling signal for reading in a non-volatile memory device;
    fetching the preliminary gain controlling signal for reading from the non-volatile memory device;
    generating a reading front monitor diode signal in a reading operation while loading an optical disc;
    calculating the preset gain controlling signal for reading at the reading process based on the preliminary gain controlling signal for reading, the preset reading front monitor diode signal, and the reading front monitor diode signal; and
    fetching the preset gain controlling signal for reading.

9. The method of claim 8, wherein calculating the preset gain controlling signal for reading at the reading process based on the preliminary gain controlling signal for reading, the preset reading front monitor diode signal, and the reading front monitor diode signal comprises:
calculating the preset gain controlling signal for reading through dividing the product of the preliminary gain controlling signal for reading and the preset reading front monitor diode signal by the reading front monitor diode signal.

10. A method for controlling a signal gain in an optical disc drive during a writing process, wherein the method comprising:
fetching a preset reading front monitor diode signal;
fetching a preset gain controlling signal for reading;
performing a writing operation;
generating a first writing front monitor diode signal;
calculating a first gain controlling signal for writing at the writing process based on the preset gain controlling signal for reading, the preset reading front monitor diode signal, and the first writing front monitor diode signal;
adjusting a first detection signal from an optical pickup of the optical disc drive according to the first gain controlling signal; and
generating a first control signal according to the adjusted first detection signal.

11. The method of claim 10, wherein the step of calculating the first gain controlling signal for writing at the writing process based on the preset gain controlling signal for reading, the preset reading front monitor diode signal, and the first writing front monitor diode signal comprises:
calculating the first gain controlling signal for writing through dividing the product of the preset gain controlling signal for reading and the preset reading front monitor diode signal by the first writing front monitor diode signal.

12. The method of claim 10, further comprising:
setting the first gain controlling signal to the preset gain controlling signal for reading if the writing process is finished.

13. The method of claim 10, further comprising:
generating a second writing front monitor diode signal if the writing process is not finished;
calculating a second gain controlling signal for writing at the writing process based on the preset gain controlling signal for reading, the preset reading front monitor diode signal, and the second writing front monitor diode signal;
adjusting a second detection signal from the optical pickup of the optical disc drive according to the second gain controlling signal; and
generating a second control signal according to the adjusted second detection signal.

14. The method of claim 13, wherein calculating the second gain controlling signal for writing at the writing process based on the preset gain controlling signal for reading, the preset reading front monitor diode signal, and the second writing front monitor diode signal comprises:
calculating the second gain controlling signal for writing through dividing the product of the preset gain controlling signal for reading and the preset reading front monitor diode signal by the second writing front monitor diode signal.

15. The method of claim 10, wherein fetching the preset reading front monitor diode signal comprises:
generating the preset reading front monitor diode signal in a reading operation while loading an optical disc;
storing the preset reading front monitor diode signal; and fetching the preset reading front monitor diode signal.

16. The method of claim 10, wherein fetching the preset reading front monitor diode signal comprises:
storing the preset reading front monitor diode signal in a non-volatile memory device; and
fetching the preset reading front monitor diode signal from the non-volatile memory device.

17. The method of claim 10, wherein fetching the preset gain controlling signal for reading comprises:
storing the preset gain controlling signal for reading in a non-volatile memory device; and
fetching the preset gain controlling signal for reading from the non-volatile memory device.

18. The method of claim 10, wherein fetching the preset gain controlling signal for reading comprises:
storing a preliminary gain controlling signal for reading in a non-volatile memory device;
fetching the preliminary gain controlling signal for reading from the non-volatile memory device;
generating a reading front monitor diode signal in a reading operation while loading an optical disc;
calculating the preset gain controlling signal for reading at the reading process based on the preliminary gain controlling signal for reading, the preset reading front monitor diode signal, and the reading front monitor diode signal; and
fetching the preset gain controlling signal for reading.

19. A signal gain control system in an optical disc drive comprising:
a front monitor diode signal conversion circuit, for generating a front monitor diode signal;
a signal processor, coupled to the front monitor diode signal conversion circuit, for generating a gain controlling signal based on the front monitor diode signal, a preset gain controlling signal for reading, and a preset reading front monitor diode signal; and
a gain adjustment unit, coupled to the signal processor, for adjusting a gain according to the gain controlling signal.

20. The system of claim 19, wherein generating the gain controlling signal based on the front monitor diode signal, the preset gain controlling signal for reading, and the preset reading front monitor diode signal comprises calculating the gain controlling signal through dividing the product of the preset gain controlling signal for reading and the preset reading front monitor diode signal by the front monitor diode signal.

21. The system of claim 19, further comprising:
an analog-to-digital converter, coupled between the front monitor diode signal conversion circuit and the signal processor, for converting the front monitor diode signal in analog form into a front monitor diode signal in digital form.

22. The system of claim 19, further comprising:
a digital-to-analog converter, coupled between the signal processor and the gain adjustment unit, for converting the gain controlling signal in digital form into a gain controlling signal in analog form.

23. The system of claim 19, further comprising:
an analog-to-digital converter, coupled between the signal processor and the gain adjustment unit, for converting the gain controlling signal in analog form into a gain controlling signal in digital form.

24. The system of claim 19, wherein the signal processor is a digital signal processor.

25. The system of claim 19, wherein the signal processor is an analog signal processor.

* * * * *